No. 620,978. Patented Mar. 14, 1899.
L. SCHUPMANN.
OPTICAL CORRECTING DEVICE FOR REFRACTING TELESCOPES.
(Application filed July 30, 1897.)
(No Model.)
Fig.1.
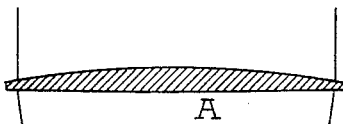
A
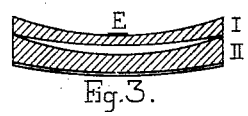
Fig.3.
Fig.2.
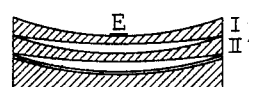
Fig.4.
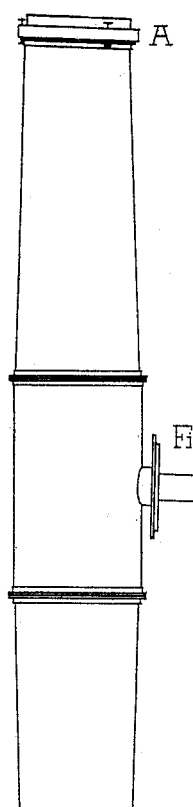
Fig.6.
Fig.5.
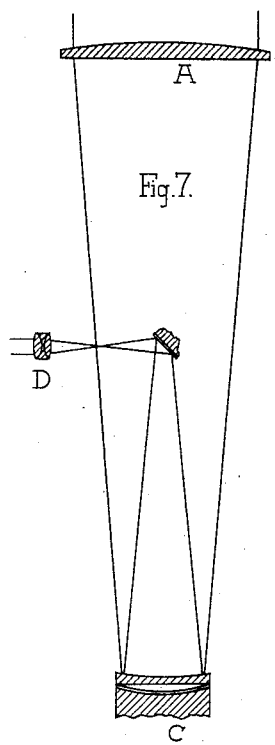
Fig.7.
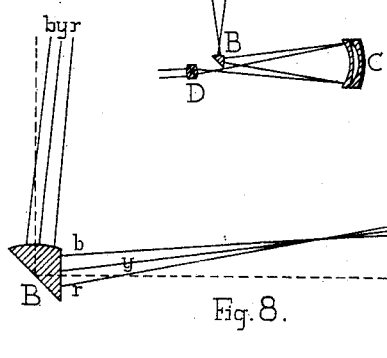
Fig.8.
Witnesses:
Paul Kussmaul.
Jean Weipel.
Inventor:
Ludwig Schupmann
by his Attorney:
Martin Schmetz

UNITED STATES PATENT OFFICE.

LUDWIG SCHUPMANN, OF AIX-LA-CHAPELLE, GERMANY.

OPTICAL CORRECTING DEVICE FOR REFRACTING-TELESCOPES.

SPECIFICATION forming part of Letters Patent No. 620,978, dated March 14, 1899.

Application filed July 30, 1897. Serial No. 646,533. (No model.)

*To all whom it may concern:*

Be it known that I, LUDWIG SCHUPMANN, a subject of the King of Prussia, German Emperor, residing at Aix-la-Chapelle, Germany, have invented a new and useful Optical Correcting Device for Refracting-Telescopes with One-Lens Object-Glasses, of which the following is an exact specification.

The object of my invention is the improvement in the correction of an object-glass consisting of a convex lens, which with reference to color and spherical aberration can in case of large telescopes be effected advantageously by means of a concave mirror, in front of which are placed two or more concave lenses, and in some cases one concave lens only.

That the construction above described possesses advantages which considerably facilitate the manufacture of large telescopes I have demonstrated by mathematical calculations, as well as by experimental research of many years' standing.

An instrument with an object-glass of five inches clear opening, sixty-four inches focal length, and five-ninths of an inch opening of the mirror has been built, and most satisfactory results have been obtained with the same.

In the accompanying drawings, Figures 1, 2, 3, and 4 are detailed sections of my correcting device. The concave mirror-surface is represented by a double line. Figs. 1 and 2 show two different arrangements of one concave lens I in front of the concave mirror-surface. Figs. 3 and 4 show two different arrangements of two concave lenses I and II in front of the concave mirror-surface. In the other figures, A indicates the object-glass, C the correcting device, and D the eyepiece. Fig. 5 shows one most effectual arrangement or construction of a complete optical-telescope system to which my invention applies. Fig. 6 is a side view of a telescope constructed with the lenses and correcting device arranged, as shown in type illustrated in Fig. 5. Fig. 7 shows another optical-telescope system to which my invention applies, so that the length of the instrument is shortened. Fig. 8 is a diagram specifically illustrating the reducing of the secondary spectrum in a telescope built according to type illustrated in Fig. 5.

On the several arrangements of my correcting device (represented in Figs. 1 to 4) there is first to remark the following: In Figs. 1 and 3 the mirror-foil is attached directly to one concave lens, while in Figs. 2 and 4 the concave mirror forms one piece by itself. The arrangement of the lenses shown in Figs. 1 and 3 has the advantage that the mirror is more durable, whereas the second construction, Figs. 2 and 4, admits of the mirror being very thick, thus rendering the same much less liable to bend. This means of carrying out my invention, Figs. 2 and 4, is therefore suitable for the larger or largest mirrors.

In large telescopes with double object-glasses the reciprocal focal length of the convex crown-glass must nearly be 2.7, the reciprocal focal length of the concave flint-glass nearly $-1.7$ when 1 denotes the positive reciprocal focal length of the whole double object-glass. On account of the slight difference between the dispersion of the crown-glass and the flint-glass there are to be taken successively more than two and a half steps forward—that is, in converging—and more than one and a half steps backward—that is, in diverging—to reach one step forward in converging. In this way the dispersions of both lenses are equal and opposite, the dispersion produced by the flint lens of $-1.7$ reciprocal focal length annulling the dispersion produced by the crown-glass of 2.7 reciprocal focal length. The optical equations show that these relations remain when the crown-glass lens is divided in two. One of these lenses has the reciprocal focal length of 1 and is left alone as object-glass. The other one, having the power (that means the reciprocal focal length) of 1.7, is gradually brought near to the focus of the instrument, together with or adjacent to the flint-glass lens having the power $-1.7$. It is true that the equal but opposite power of the two lenses must be increased in order to furnish an achromatic system. The optical equations show that the multiplication of the said necessary powers by the quotient, which I obtain by dividing the square number of the diameter of the cone of rays belonging to the said two lenses by the square number of the diameter of the cone of rays belonging to the object-glass, will always be the same number, (in my case for the above said lenses +1.7 and −1.7,) provided that the same sort of glass has been employed. If therefore I mention in the following numbers of power, the same are to be understood as already multiplied by the above-named quotient. By this means I have represented a dialytical telescope, and that one of the class which has first been indicated by Rogers. We see that the principle of the dialytical telescopes is the same as that of the double-lens refracting-telescopes, and consequently the advantages of the dialytical constructions are comparatively small. The secondary spectrum will appear in nearly the same degree as in the double-lens refracting-telescopes, this being notoriously the greatest inconvenience which the lens-telescopes possess. To repeat, we have after the shifting of the two lenses the following conditions: The flint-glass lens having the power −1.7 annuls the dispersion of the two crown-glass lenses having the power $1.0+1.7=2.7$, and on the other side the crown-glass lens having the power +1.7 annuls the divergence of the flint-glass lens having the power −1.7. The rays pass therefore nearly without refraction through the double-lens combination, which is arranged between the object-glass and the focus. It is now possible to substitute for the said two lenses a single flint-glass lens consisting of the above-supposed sort of flint-glass and having the power $\frac{-1 \times 1.7}{2.7} = -0.63$, and thus to obtain an achromatic system, because this single flint-glass lens, as we must conclude, annuls the whole dispersion of the object-glass. This system has, however, the inconvenience that the flint-glass lens spreads out the cone of rays to such a width that its diameter in the focal plane of the object glass—that is, at the point where the rays coming from the object-glass intersect—is 0.63 of the diameter of the object-glass. It can happen that the rays do not unite at all, or in other circumstances at a great distance from the object-glass, according as the distance of the flint-glass lens from the object-glass has been chosen. This inconvenience can be got rid of at one stroke if a concave mirror is placed beyond the flint-glass lens, so that the rays traverse at first the flint-glass lens, then being reflected by the concave mirror, and after having passed through the lens a second time unite at a point between the object-glass and the flint-glass lens. In order to maintain also after the latter modification the system still achromatic, the power of the flint-glass lens can only be $\frac{-0.63}{2} = -0.315$, because it is twice traversed. The curvature of the concave mirror may be taken of any size, because the same does not produce a color aberration and is therefore of no influence upon the achromatism of the system. On the character of a system constructed in this manner I arrive at the following conclusions:

First. The so-called "secondary spectrum" remaining in such a system in the same conditions is 2.7 times smaller than the secondary spectrum remaining in a double-lens object-glass or in a dialytical telescope, for in the former the dispersion of a crown-glass lens having the power 1.0 is annulled by the dispersion of a flint-glass lens having the power −0.63, while in the latter the dispersion of a crown-glass lens having the power 2.7 is annulled by the dispersion of a flint-glass lens having the power −1.7. This former correction of the chromatic aberration of the object-glass is consequently obtained in the optically most direct way. This portion of the secondary spectrum is still diminished to about one-fourth by the fact that in my construction may be employed a much lighter flint, which in the intervals of dispersion is more like the crown-glass than the ordinary flint-glass. It is even possible to construct on my system an instrument in which the object-glass and the concave lenses are made of the same glass, whereby the secondary spectrum fully disappears; but in this case I do not get as small mirrors as might be desired.

Second. The spherical aberration which is to be corrected in such a system is inconsiderable, generally 2.73, equaling about twenty times smaller than in a refracting-telescope of the usual construction, as the spherical aberration increases by the cube of the power, and consequently the remaining parts of this aberration will prove very small. It is known that a mirror-surface produces a very small aberration, so that it will be of no importance for this general demonstration.

Third. The defects which appear ordinarily in the images produced by mirrors are in such a system so reduced that there can be no question about them.

The most important inconvenience of mirror-telescopes consists in the fact that the large object-mirror bends, owing to its gravity, thus causing the inexactness of the images; but if we interpose a mirror-surface near to the focus in the path of the rays the mirror will become smaller. If we assume, for instance, that the mirror is placed so near to the focus that it is one-tenth of the size of the object-glass lens the equations of elasticity show that its bending and angular deflection by the gravity is only the tenth part, provided that the proportion of the thickness of the mirror to its diameter remains the same; but, moreover, the optical equations show that the effect of this bending upon the image is only the tenth part of the actual deflection. In this case the disadvantageous influence of a mirror-surface upon the figure is reduced to the one-hundredth part and is of no further consequence.

The second disadvantage of the mirror-surface consists in the fact that, other things being equal, they must be polished with nearly the fourfold exactness as a glass lens to reproduce the images as exactly as a glass lens; also in this case the optical theory shows that a mirror-surface which is placed so near to the focus that its diameter is only the one-fourth part of the diameter of the object-glass produces no greater errors in the image than a glass lens which is employed as object-glass and has the same exactness of polishing.

The third disadvantage of the mirror-surfaces—that they are liable to oxidate—can be diminished to a high degree by placing the concave lens with its edges directly upon the mirror-surface to intercept as far as possible the access of air. The said disadvantage can be wholly avoided if the mirror-surface is directly adapted on the rear face of the glass.

Returning to our system, we have now taken one step forward, (converging,) 0.63 step backward, (diverging,) and 0.63 step forward (converging mirror) if with the former conditions we make the power of the mirror equal and opposite to that of the flint-glass lens. The round-about way made is therefore $2 \times 0.63 = 1.26$ instead of $2 \times 1.7 = 3.4$ by the double object-glass. The system obtained in this way can be further modified by removing the correcting device gradually still further from the object-glass, so that it reaches first the focus, then passes the latter, and is placed in a point where the cone of rays is again spread out. After this modification the proportions of numbers of the required powers remain the same as set forth above. The curvature of the concave mirror-surface in this arrangement is preferably so chosen that the rays unite approximately in the same focus they have come from.

The secondary spectrum means the rest of color aberration which remains for the blue and red rays if the yellow rays are united, the flint-glass refracting too much the blue rays and not enough the red rays with regard to the crown-glass. In my construction this remaining spectrum is only about one-fourth of an ordinary one, and this little remainder will be annulled as follows: We will first assume that the compensating device is placed between the object-glass and its focus. The blue, yellow, and red rays coming from one point on the edge of the object-glass will diverge on leaving the object-glass by reason of its color dispersion, the blue rays reaching the compensating device nearest the center, the red rays at the greatest distance. The blue rays will be consequently less refracted by the flint-glass, the red rays more, whereby we obtain the desired result. This difference, which has been neglected in the conclusions made above on the secondary spectrum, suffices to annul the remaining one-fourth of the said secondary spectrum. The instrument constructed in this way is represented in Fig. 7, the plane mirror having only the purpose to make the image visible for the eye and being able to be attached to the object-glass. In the second case when the compensating device is placed on the other side of the focus these relations are reversed. The rays coming from one point on the edge of the object-glass will pass the focus before reaching the correcting device, the blue rays being at the greatest distance from the center of the correcting device, the red rays at the nearest. Thereby we lose one part of the advantage with respect to the secondary spectrum, but we can regain it by placing in the focus of the object-glass a convex lens or a small concave mirror or a prism, which latter has at least one convex surface, and on the plane face of same the light is totally reflected in order to bring it easily to the eye. This total reflection has no influence on our consideration, because the way of the rays is changed wholly in the same way. The latter combination is shown in Fig. 5. If we give to the prism such a focal distance $f$ that the correcting device and the object-glass are placed in conjugated points—that is, $\dfrac{1}{AB} + \dfrac{1}{BC} = \dfrac{1}{f}$, where A B means the distance between the object-glass and the prism, B C the distance between the prism and the correcting device, all the rays of different color coming from one point on the edge of the object-glass will reach the prism in different points. Passing then the prism they are refracted, and according to the above-defined focal distance of the prism they are united with great approximation in one point of the correcting device. Consequently the red and blue rays reach the correcting device at the same distance from its center and only the aforesaid one-fourth of the secondary spectrum will appear. If now the focal distance of the prism is shortened, we obtain the relations, as shown in the diagram Fig. 8. The blue rays are denoted by $b$, the yellow rays by $y$, and the red rays by $r$. The rays of different colors coming from one point of the object-glass are caused by this shortening of the focal distance of the prism to cross. The blue ray reaches the correcting device nearer to the axis than the red ray, this result being very suitable for our purpose, as set forth above. We have the means to increase this difference at will, and, if desired, to annul totally the secondary spectrum. Yet in connection with this shortening of the focal distance of the prism most subtile defects appear, by which reason it seems we do well to allow one-tenth or one-twentieth of the secondary spectrum. Among the constructions to which my invention of this correcting device applies may be discussed only the best ones and first the construction shown in Fig. 5.

In Fig. 5, A is the convex object-lens, which for the purpose of illustration is assumed to have a diameter of thirty inches. It is, however, desirable to determine the object-glass, so that the same may as far as possible fulfil the condition as to the sine. B is a perfectly reflecting prism, one side of which is convex. The focal length of this prism is somewhat less than the distance B to C, Fig. 5. A thirty-inch telescope constructed in this manner would have a prism of such dimensions that the cathetus-face would be about one inch. C, Fig. 5, shows the said correcting device, with the lenses arranged as shown in Fig. 3. The diameter of the mirror and of the concave lenses would not exceed, say, three-fourths of an inch. In most instances in order to overcome the divergence of color very light flint-glass may be employed for the concave lenses, say $n=1.56$. When employing the construction shown in Fig. 3, it is desirable to make lens I of ordinary flint-glass, say $n=1.62$, and lens II of ordinary crown-glass, the latter being therefore more solid and the lens less liable to bend. The errors occasioned by the bending of these mirrors in consequence of their weight do not exceed, say, one sixty-fourth to one one-hundredth of the errors appertaining to reflecting-telescopes of the ordinary kind. The distance B C is about one-eighth to one-tenth of A B. The many disturbing reflections of the glass surfaces are rendered totally invisible by an opaque coating E, Figs. 3 and 4, at the center of the lens I to about one-tenth of the diameter of the mirror.

D, Fig. 5, shows the location of the ocular lenses. If the focal length of the prism is so diminished that the rays of different color are crossing between the prism and the correcting device, Fig. 8, the ocular lenses must be so constructed that they are overcorrected in color, which means that they produce negative dispersion, so that the lateral parts of the field of vision present no colored fringes. This negative dispersion is obtained by a concave lens of extra dense flint-glass and of two or three convex crown-glass lenses. One looks into the ocular lens just beyond the prism. The erroneous reflections occasioned by the oblique position of the mirror produce defects, which can be obviated by a trifling inclination of the object-glass, these defects decreasing in proportion to the increase in the size of the instrument. The secondary spectrum is reduced to the smallest possible fraction, about one-tenth to one-twentieth, and can be even reversed by increasing the curvature of the prism. This result has been proved beyond doubt by experimental research, and such experiments have also shown that by diminishing the curvature of the prism the secondary spectrum would increase. When the prism has the correct curvature, the achromatism is by a happy accident attained at the axis and also at the margin or ledge of the object-glass, (the fulfilling of the condition Gauss.) The loss of light produced by the various refractions is already in instruments of twelve inches opening being compensated by the annulling of the secondary spectrum. When spherical surfaces are employed for all optical curved surfaces of this construction, especially when the correcting device is constructed according to Fig. 3, the union of the light is, in relation to the spherical aberration, nearly ideal.

I have tested the modification shown in Fig. 7, which only by means of the object-glass and my correcting device unites the light perfectly in the focus, as said above. This construction is of value, because it permits the diminished length of the tube of the instrument and facilitates the compensation of the secondary spectrum. Such modifications have the defect that the mirrors must be larger than desirable, although for not too large instruments they can be advantageously employed. For these instruments the best forms of the correcting device are Figs. 1 and 2 to diminish the glass reflections as far as possible, for it is hardly possible to render by this construction the glass reflections totally invisible. These glass reflections spread over the field of view an everywhere homogeneous faint glimmer, which is not very detrimental.

My invention when compared with ordinary double object-glass telescopes will be found to possess in constructions where the object-lenses are twelve inches and upward very considerable advantages over those already known, and with larger instruments these advantages are even more clearly characterized, and may be summarized as follows:

First. The secondary spectrum is compensated or at least reduced to a very small fraction.

Second. This invention renders it possible to considerably reduce the length of the tube, as the chromatic compensation is a direct one and the spherical aberrations are much smaller than in the case of a double-lens object-glass.

Third. It is only necessary to make use of a large object-lens in the place of two large object-glasses.

The mirror and the concave lenses are so small that the cost of their manufacture needs not be considered.

Having thus described my invention, what I claim, and desire to secure by Letters Patent, is—

1. In a telescope with a not achromatic object-glass of positive focal length, a correcting device, serving the purpose, to correct the positive chromatic aberration of the object-glass, and consisting of a concave mirror-surface, in front of which glass surfaces are arranged and so formed, that these glass surfaces effect a dioptrical system with negative focal length and with negative chromatic aberration; and which dioptrical system is passed twice by the light, firstly before reaching the mirror-surface, secondly after having been reflected by the same, as described.

2. In a telescope with a single convex object-lens, closely by the focus of which is placed a totally-reflecting convex prism, a correcting device, serving the purpose, to correct the positive chromatic aberration of the object-glass, and consisting of a concave mirror-surface, in front of which are placed two concave lenses; and which correcting device is reached by the light, after it has been united in the focus of the object-glass, as set forth.

In testimony whereof I have signed this specification in the presence of two subscribing witnesses.

LUDWIG SCHUPMANN.

Witnesses:
    JOHN HECKMANNS,
    W. C. EMMET.

It is hereby certified that in Letters Patent No. 620,978, granted March 14, 1899, upon the application of Ludwig Schupmann, of Aix-la-Chapelle, Germany, for an improvement in "Optical Correcting Devices for Refracting-Telescopes" errors appear in the printed specification requiring correction as follows: In line 99, page 2, the number "2.73" should read *2.7³;* and page 4, lines 15–16, the words "three-fourths of an inch" should read *three to four inches;* and that the said Letters Patent should be read with these corrections therein that the same may conform to the record of the case in the Patent Office.

Signed, countersigned, and sealed this 16th day of May, A. D., 1899.

[SEAL.]

WEBSTER DAVIS,
*Assistant Secretary of the Interior.*

Countersigned:

C. H. DUELL,
*Commissioner of Patents.*